United States Patent
Mo et al.

(10) Patent No.: US 9,681,484 B2
(45) Date of Patent: Jun. 13, 2017

(54) NETWORKING METHOD FOR MOBILE TERMINALS AND MOBILE TERMINAL

(71) Applicant: Sanechips Technology Co. Ltd., Shenzhen, Guangdong (CN)

(72) Inventors: Zhiwei Mo, Shenzhen (CN); Ning Chen, Shenzhen (CN); Xiaoming Zhu, Shenzhen (CN)

(73) Assignee: Sanechips Technology Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 14/655,577

(22) PCT Filed: Aug. 29, 2013

(86) PCT No.: PCT/CN2013/082574
§ 371 (c)(1),
(2) Date: Jun. 25, 2015

(87) PCT Pub. No.: WO2013/189453
PCT Pub. Date: Dec. 27, 2013

(65) Prior Publication Data
US 2015/0359027 A1 Dec. 10, 2015

(30) Foreign Application Priority Data
Dec. 27, 2012 (CN) .......................... 2012 1 0579199

(51) Int. Cl.
*H04W 16/14* (2009.01)
*H04W 76/02* (2009.01)
(Continued)

(52) U.S. Cl.
CPC ......... *H04W 76/025* (2013.01); *H04W 16/14* (2013.01); *H04W 88/02* (2013.01); *H04W 88/08* (2013.01)

(58) Field of Classification Search
CPC ... H04W 76/025; H04W 16/14; H04W 88/08; H04W 88/02
See application file for complete search history.

(56) References Cited

U.S. PATENT DOCUMENTS

2006/0193295 A1* 8/2006 White ................. H04L 12/5692
370/336
2008/0304458 A1* 12/2008 Aghvami .............. H04W 48/16
370/338
(Continued)

FOREIGN PATENT DOCUMENTS

CN 1917690 A 2/2007
CN 101977391 A 2/2011
(Continued)

OTHER PUBLICATIONS

International Search Report in international application No. PCT/CN2013/082574, mailed on Nov. 28, 2013.
(Continued)

*Primary Examiner* — Chi H Pham
*Assistant Examiner* — Shailendra Kumar
(74) *Attorney, Agent, or Firm* — Oppedahl Patent Law Firm LLC

(57) ABSTRACT

A networking method for mobile terminals is provided, including: dividing a frequency spectrum resource suitable for operation in a mobile communication network into three kinds of frequency bands which are a CB, a LB, and a UB; and establishing, by a calling mobile terminal, a radio communication connection with a called mobile terminal on the CB or the LB or the UB; wherein the calling mobile terminal and the called mobile terminal are implemented by an SDR way. The present disclosure also discloses a mobile terminal. Accordingly, not only a utilization rate of a frequency spectrum resource and a resource usage rate of a base station are improved, a coverage range of the mobile
(Continued)

communication network is expanded, but also mobile terminal user experience is improved.

3 Claims, 4 Drawing Sheets

(51) Int. Cl.
*H04W 88/02* (2009.01)
*H04W 88/08* (2009.01)

(56) References Cited

U.S. PATENT DOCUMENTS

| | | | | |
|---|---|---|---|---|
| 2010/0009675 A1* | 1/2010 | Wijting | ................ | H04W 72/02 455/426.1 |
| 2012/0106461 A1* | 5/2012 | Kasslin | ................ | H04W 16/14 370/329 |
| 2013/0188552 A1* | 7/2013 | Kazmi | ................... | H04L 5/001 370/315 |
| 2013/0288668 A1* | 10/2013 | Pragada | ................ | H04W 12/06 455/426.1 |
| 2013/0294356 A1* | 11/2013 | Bala | ..................... | H04W 16/14 370/329 |
| 2014/0134974 A1* | 5/2014 | Kuo | ...................... | H04M 15/93 455/406 |
| 2015/0111596 A1* | 4/2015 | Ruuska | ................. | H04W 16/14 455/454 |
| 2015/0133131 A1* | 5/2015 | Van Phan | ............. | H04W 72/04 455/450 |

FOREIGN PATENT DOCUMENTS

| | | |
|---|---|---|
| CN | 102123000 A | 7/2011 |
| CN | 102790969 A | 11/2012 |
| CN | 102812772 A | 12/2012 |
| JP | 2006279376 A | 10/2006 |

OTHER PUBLICATIONS

English Translation of the Written Opinion of the International Search Authority in international application No. PCT/CN2013/082574, mailed on Nov. 28, 2013.

Fujitsu Microelectronics America, Inc.;Spectrum utilization WiMAX broadband wireless access and interface analysis,Electronic Engineering Times—China, mailed on May 23, 2005 ,pp. 1-3.

\* cited by examiner

NETWORKING METHOD FOR MOBILE TERMINALS AND MOBILE TERMINAL

TECHNICAL FIELD

The present disclosure relates to a mobile communication field, and particularly to a networking method for mobile terminals and a mobile terminal.

BACKGROUND

All networking methods for an existing commercial mobile communication system, including 2 Generation (2G) such as a Global System for Mobile Communications (GSM) and a Code Division Multiple Access (CDMA) IS-95 communication system, and 3 Generation (3G) such as a Wideband Code Division Multiple Access (WCDMA) communication system, a Time Division-Synchronous Code Division Multiple Access (TD-SCDMA) communication system, CDMA2000 and Worldwide Interoperability for Microwave Access (Wimax), and 4 Generation (4G) which currently is now gradually put into commercial application such as Long Term Evolution (LTE) and Long Term Evolution Advanced (LTE-A), and etc., are operator networking. After base station equipment is built in a special coverage area, a mobile communication network is organized, and then base on this network, a mobile terminal user is gradually developed.

If one mobile terminal user (a source mobile terminal user) desires to communicate with another mobile terminal user (a target mobile terminal user), then the source mobile terminal user has to first establish a radio connection with a source base station in an area in which the source mobile terminal user is located, passes through a mobile communication network to reach a target base station coverage area in which a target mobile terminal user is located, and then establishes a radio connection with the target mobile terminal user through the target base station to realize mobile communication between the two users, as shown in FIG. 1.

In an existing networking way, a mobile operator first needs to invest and buy a radio frequency spectrum resource, and then invest and build the mobile communication network; a user needs to invest and buy a mobile terminal, rent a network of the mobile operator, and pay to the mobile operator in accordance with call duration or data communication traffic.

Network building of the mobile operator is limited by many factors (for example, considering an investment return rate, overall network coverage cannot be implemented in a vast and sparsely populated area; also for example, limited by the amount of base station addresses, a network capacity in a hotspot area (an ability indicating how many mobile terminal users are allowed for simultaneous access) can also not be unlimited), so there may always be an area in which many mobile terminal users cannot perform communication. With regard to the mobile operators, maybe the radio frequency spectrum resource of these areas is idle, but if any one of two mobile terminals is lack of an idle resource of a base station, then a communication connection still cannot be established between two mobile terminals. In this case, with regard to the mobile operators, not only the radio frequency spectrum resource is wasted, but also the investment return rate associated with buying of the radio frequency spectrum resource is reduced; in addition, the reason of failure to establish the communication connection is that any one of two mobile terminals is lack of the idle resource of the base station, then with regard to a base station allowed to be accessed by a mobile terminal, the waste of self-resource is caused by saturation of resources of an opposite base station. With regard to a mobile terminal user, there is an area and a time period in which the mobile terminal bought by a mobile terminal user cannot be used, user experience is affected.

SUMMARY

In schematic diagram of this, a main purpose of embodiments of the present disclosure is to provide a terminal networking method and a mobile terminal, to solve a problem that in mobile communication based on an existing operator networking manner, there is an area in which a mobile terminal user cannot perform communication.

In order to achieve the above purpose, a technical scheme of an embodiment of the present disclosure is implemented like this:

The embodiment of the present disclosure provides a networking method for mobile terminals, which may include:

a frequency spectrum resource suitable for operation in a mobile communication network is divided into three kinds of frequency bands: a Commercial Frequency Band (CB), a Licensed Frequency Band (LB), and an Unlicensed Frequency Band (UB); and a calling mobile terminal establishes a radio communication connection with a called mobile terminal on the CB or the LB or the UB; wherein the calling mobile terminal and the called mobile terminal are implemented by a Software Defined Radio (SDR) way.

In the above scheme, the calling mobile terminal may establish a point to point radio communication connection with the called mobile terminal on the LB or the UB.

In the above scheme, the point to point radio communication connection may include:

a direct point to point radio communication connection between the calling terminal and the called terminal; or a point to point radio communication connection passing through a single hop or multi-hop relay mobile terminal between the calling terminal and the called terminal; or a group point to point radio communication connection passing through a single hop or multi-hop relay mobile terminal between one calling terminal and at least one called terminal.

In the above scheme, the method may further include:

the calling mobile terminal establishes the point to point radio communication connection with the called mobile terminal on the UB, when the calling mobile terminal and the called terminal are located in an area not covered by the mobile communication network, or located in an area covered by the mobile communication network, but a capacity is full.

In the above scheme, the method may further include:

a base station, which receives a radio communication connection establishment request from the calling mobile terminal, acquires position information of the calling mobile terminal and the called mobile terminal or a radio signal intensity measurement value between the calling mobile terminal and the called mobile terminal, when the calling mobile terminal and the called mobile terminal are located in an area covered by the mobile communication network; and the base station notifies the calling mobile terminal to establish the point to point radio communication connection with the called mobile terminal on the authorized LB determining when the base station determines according to the position information that a distance between the calling mobile terminal and the called mobile terminal is smaller than a preset value according to the position information, or that the radio signal intensity measurement value between the calling mobile terminal and the called mobile terminal is larger than a second preset value.

The relay mobile terminal may report periodically charging basic information to a base station in the mobile communication network through a measurement message;

wherein the charging basic information may include: information of one or more mobile terminals receiving a relay service provided by the relay mobile terminal, and a time length of the relay service provided by the relay mobile terminal to the one or more mobile terminals, and/or data traffic transferred when the relay mobile terminal provides the relay service.

In the above scheme, the relay mobile terminal may be implemented by the SDR way.

Another embodiment of the present disclosure further provides a mobile terminal, implemented by an SDR way, wherein a frequency spectrum resource suitable for operation in a mobile communication network may include three kinds of frequency bands: a CB, a LB, and a UB; and the mobile terminal may include:

a frequency band configuration module, configured to configure information of the CB and the LB and the UB; and a communication module, configured to establish a radio communication connection on the CB or the LB or the UB.

In the above scheme, the communication module may be further configured to establish a point to point radio communication connection on the LB or the UB, wherein the point to point radio communication connection may be:

a direct point to point radio communication connection between the calling terminal and the called terminal; or a point to point radio communication connection passing through a single hop or multi-hop relay mobile terminal between the calling terminal and the called terminal; or a group point to point radio communication connection passing through a single hop or multi-hop relay mobile terminal between one calling terminal and at least one called terminal.

In the above scheme, the mobile terminal may further include a relay module, configured to provide a relay service for establishment of the point to point radio communication connection on the LB or the UB.

In the above scheme, the mobile terminal may further include a charging module, configured to acquire charging basic information from the relay module, and periodically report the charging basic information to a base station in the mobile communication network through a measurement message;

the relay module is further configured to collect the charging basic information; wherein the charging basic information may include: information of one or more mobile terminals receiving a relay service, and a time length for providing the relay service and/or data traffic transferred when providing the relay service.

According to the networking method for mobile terminals and the mobile terminal provided by the embodiments of the present disclosure, a frequency spectrum resource suitable for operation in a mobile communication network is divided into three frequency bands which respectively are a CB, a LB and a UB; a calling mobile terminal establishes a radio communication connection with a called mobile terminal on the CB or the LB or the UB. By using the LB and the UB, a frequency spectrum resource utilization rate is improved; in addition, by using the UB, the mobile terminal can establish a call in an area outside an original core network, and user experience is improved; when a distance between two mobile terminals is short, the CB which has Quality of Service (QoS) and involves a high cost rate is not adopted, a call can be guaranteed to get through only using the LB, thereby saving a mobile user call cost and improving the user experience in one aspect, while improving a frequency utilization rate in another aspect; in addition, the mobile terminals in the above scheme of the present disclosure are all implemented by an SDR way, in this way, the mobile terminal is provided with a relay ability and a point to point radio interconnection ability in a low cost software upgrading way, thereby supporting implementation of the above networking method.

DETAILED DESCRIPTION

A technical scheme of the present disclosure is further explained in detail below in combination with accompanied drawings and specific embodiments.

Figure 1:
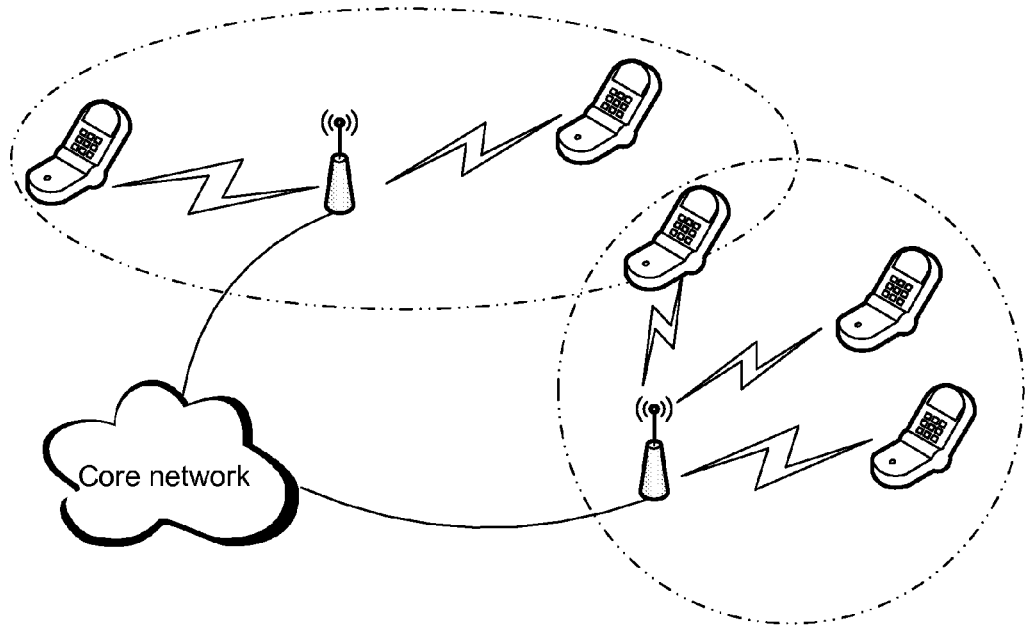
FIG. 1 is a schematic diagram of establishing a radio communication connection by a mobile terminal based on an existing networking way.
Figure 2:
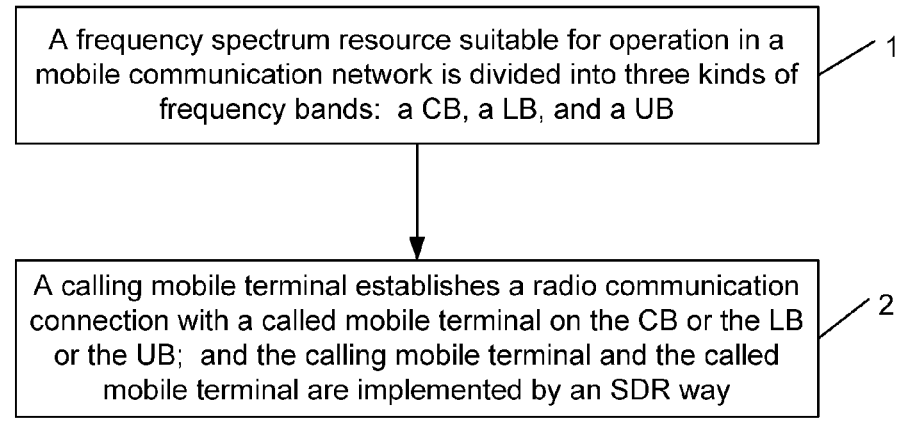
FIG. 2 is a flowchart of a networking method for mobile terminals provided by an embodiment of the present disclosure.

As show in FIG. 2, in a networking method for mobile terminals provided by an embodiment of the present disclosure: first, a frequency spectrum resource suitable for operation in a mobile communication network is divided into three kinds of frequency bands which are a CB, a LB, and a UB; and then, a calling mobile terminal establishes a radio communication connection with a called mobile terminal on the CB or the LB or the UB.

The CB has QoS. In order to achieve the above scheme, an existing base station function is needed to be extended to add a function of detecting the LB and the UB.

The establishment of the radio communication connection on the CB by a mobile terminal is prior art, and is not described again. What is concerned about by the embodiment of the present disclosure is how to establish the radio communication connection on the LB or the UB, the detail is shown in the following:

a calling mobile terminal establishes a point to point radio communication connection with the called mobile terminal on the LB or the UB.

Figure 3:
FIG. 3 is a first schematic diagram of a point to point radio communication connection based on a networking way of an embodiment of the present disclosure.
Figure 4:
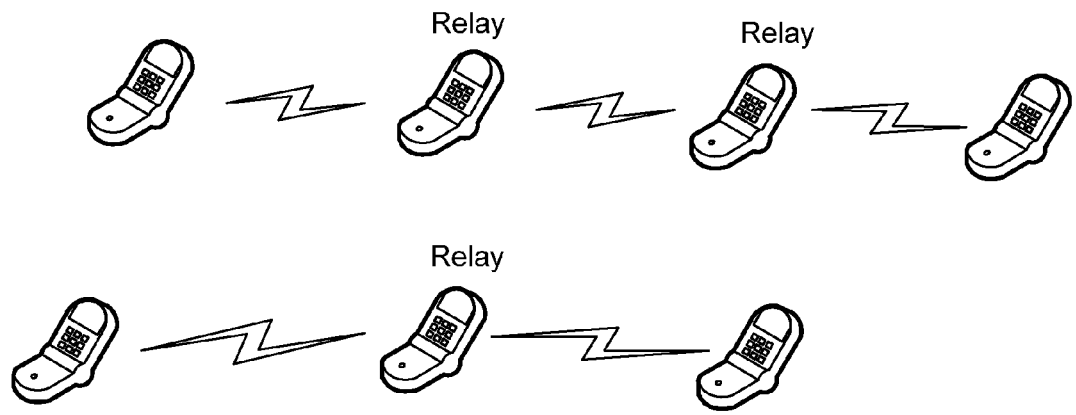
FIG. 4 is a second schematic diagram of the point to point radio communication connection based on the networking way of the embodiment of the present disclosure.
Figure 5:
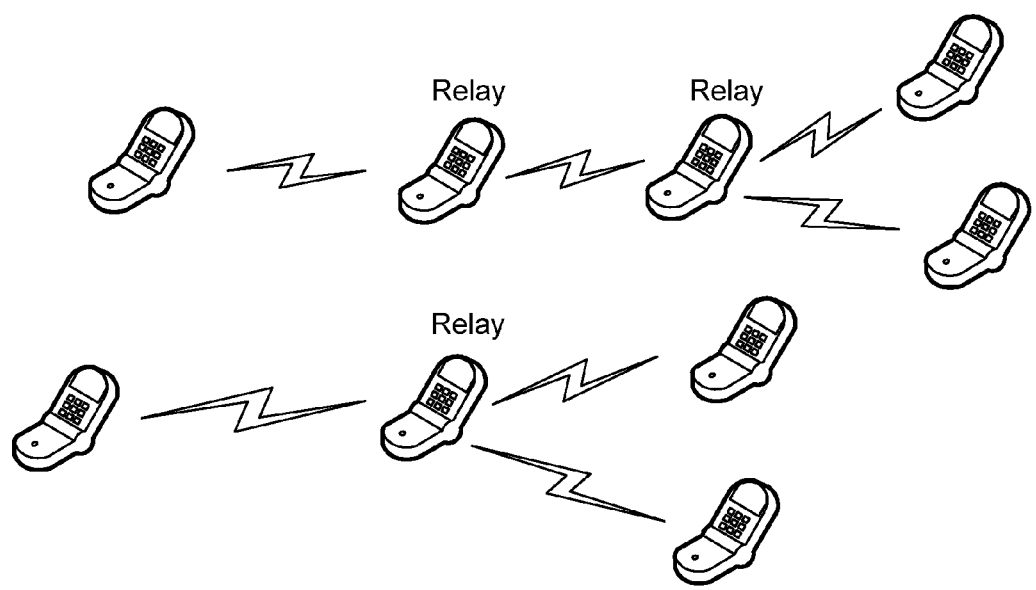
FIG. 5 is a third schematic diagram of the point to point radio communication connection based on the networking way of the embodiment of the present disclosure.

The above point to point radio communication connection includes three forms:

the first one is a direct point to point radio communication connection between the calling terminal and the called terminal, as shown in FIG. 3;

the second one is a point to point radio communication connection passing through a single hop or multi-hop relay mobile terminal between the calling terminal and the called terminal, as shown in FIG. 4; and the third one is a group point to point radio communication connection passing through the single hop or multi-hop relay mobile terminal between one calling terminal and at least one called terminal, as shown in FIG. 5.

Here, a circumstance of establishing the point to point radio communication connection on the UB includes: when the calling mobile terminal and the called mobile terminal are located in an area not covered by the mobile communication network (namely the area outside a core network), or located in an area covered by the mobile communication network but a capacity is full (no available frequency spectrum resource), the calling mobile terminal establishes the point to point radio communication connection with the called mobile terminal on the UB. According to an actual situation, this point to point radio communication connection may adopt the above three forms.

In an actual application scene, the UB is also needed to be used in another situation, for example, the calling mobile terminal is located outside the area covered by the mobile communication network; in this situation, the calling mobile terminal searches for a mobile terminal which can provide a relay service, accesses the mobile communication network through this relay mobile terminal, and establishes a connection with the called mobile terminal, wherein, the calling mobile terminal establishes the connection with the relay mobile terminal through the UB; also for example, the called mobile terminal is located outside the area covered by the mobile communication network, in this situation, the calling mobile terminal accesses a base station in the mobile communication network, and this base station searches for a mobile terminal which can provide a relay service, controls such a relay mobile terminal to establish a connection with the called mobile terminal on the UB. Here, the connection based on the UB between the calling or called mobile terminal and the relay mobile terminal is also called the point to point radio communication connection (the first point to point radio communication connection form). This radio communication connection establishment way takes the mobile terminal of a user as a relay, expands the area covered by an original core network; in this way, based on an existing networking hardware basis, without adding any extra hardware resource (it only needs to add a relay function in a part of the mobile terminals, the mobile terminal implemented in the SDR way can then have the relay function by a low cost software upgrading way; if the mobile terminal implemented by an Application Specific Integrated Circuit (ASIC) needs to have the relay function, an additional hardware resource is needed to be added for support), so that expansion of the core network coverage area can be implemented; in this way, the user in a vast and sparsely populated area not covered by a network originally, can access the core network and call other mobile terminals and may also be called by a mobile terminal in the core network, as long as a mobile terminal which can provide a relay service can be found.

The circumstance of establishing the point to point radio communication connection on the LB is: when the calling mobile terminal and the called mobile terminal are located in the area covered by the mobile communication network, a base station receiving a radio communication connection establishment request from the calling mobile terminal acquires position information of the calling mobile terminal and the called mobile terminal, and if a distance between the calling mobile terminal and the called mobile terminal is short (for example smaller than a first preset value), then the base station notifies the calling mobile terminal to establish the point to point radio communication connection with the called mobile terminal on an authorized LB. In this embodiment, the position information of the mobile terminal is acquired through positioning of a position service, wherein positioning of the position service includes positioning through a Global Positioning System (GPS), an Assisted GPS (A-GPS), an Observed Time Difference of Arrival (OTDOA) method, and etc. In addition, the base station receiving the radio communication connection establishment request from the calling mobile terminal may also acquire a radio signal intensity measurement value between the calling mobile terminal and the called mobile terminal (in this embodiment, the base station may send measurement control information to make two mobile terminals return or report the radio signal intensity measurement value between them); when the base station determines a difference between the radio signal intensity measurement values of the calling mobile terminal and the called mobile terminal is larger than a second preset value, the base station notifies the calling mobile terminal to establish the point to point radio communication connection with the called mobile terminal on the authorized LB. The point to point radio communication connection in this embodiment may adopt the above three forms.

It should be pointed out, the use of LB needs authorization; when receiving the radio communication connection establishment request from the calling mobile terminal, the base station may perform LB authorization for the radio communication connection between the calling mobile terminal and the called mobile terminal. This radio communication connection establishment way is adopted mainly because the distance between two mobile terminals is short and call quality may not be significantly influenced although the base station is not passed through. In addition, in this process, the base station only participates in charging and an initial establishment request of the radio communication connection, and intermediate calling process traffic does not pass through the base station; not only a base station capacity requirement can be reduced, but also equipment investment of a mobile operator can be reduced and a frequency spectrum utilization rate on the LB is improved.

In the above radio communication connection establishment process, a part of mobile terminals are taken as a relay, therefore these mobile terminals may acquire a shared charging revenue, provided that the relay mobile terminal is needed to periodically report charging basic information to the base station through a measurement message; the charging basic information includes: information of one or more mobile terminals receiving a relay service provided by the relay mobile terminal, and the time length for providing the relay service by the relay mobile terminal to one or more mobile terminals, and/or data traffic transferred when the relay mobile terminal provides the relay service; according to these charging basic information, a network side may calculate charging information in accordance with a corresponding cost rate which is set in a system, and share a revenue to the relay mobile terminal.

Based on the networking way provided by the embodiment of the present disclosure, in a specific application, when different frequency bands are adopted to provide the relay service, the shared charging revenues obtained by the mobile terminals are different. For example, this embodiment provides three cost rates, which are shown below separately:

C1: a cost rate corresponding to a radio communication connection is set between two mobile terminals on the CB through a relay mobile terminal;

C2: a cost rate corresponding to a radio communication connection is set between two mobile terminals on the LB through a relay mobile terminal; and C3: a cost rate corresponding to a radio communication connection is set between two mobile terminals on the UB through a relay mobile terminal.

The CB has the QoS, the LB does not have the QoS but is needed to be authorized, and the UB is not needed to be authorized, therefore preferably it may be set as C1>C2>C3. Then the shared charging revenue acquired by the base station providing a relay service on the CB is maximum, and the secondary one is a mobile terminal providing a relay service on the LB, and the last one is a mobile terminal providing a relay service on the UB.

In the embodiment of the present disclosure, the UB preferably is an idle frequency resource, and the UB serves the area outside the core network; then a more flexible charging strategy may be made, the cost rate corresponding to the radio communication connection established by using this UB is set to be low or free. Then, with regard to the area outside the core network (generally the area in which a base station guarantees a coverage rate is not established considering an investment return rate), more mobile users may be attracted by an almost free policy; simultaneously, a compensation measure for inadequate network coverage is given so that user satisfaction is improved, and also a frequency resource utilization rate is improved in a way of using an idle frequency spectrum (the UB).

Figure 6:
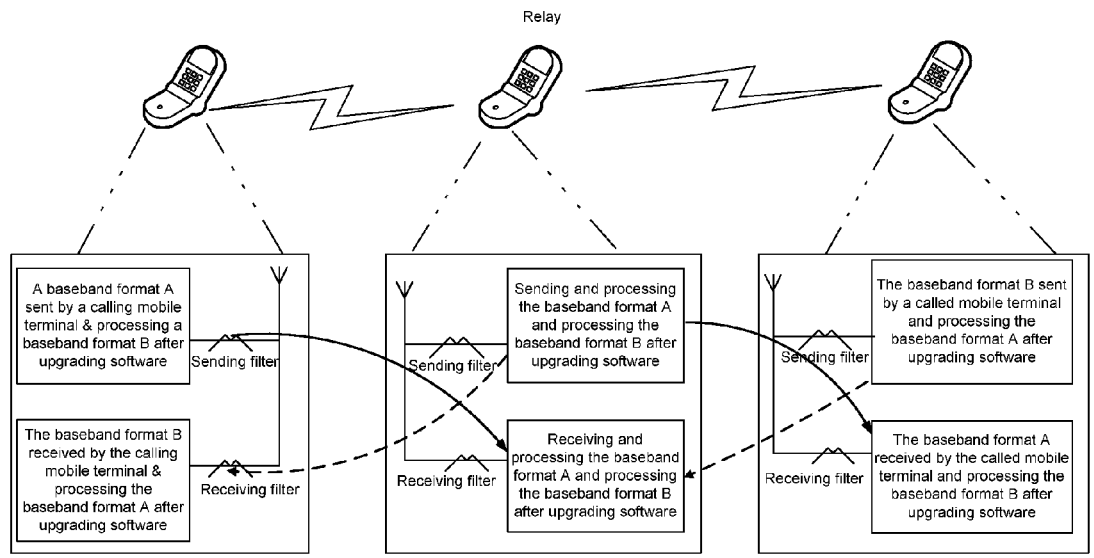
FIG. 6 is a schematic diagram showing a mobile terminal implemented by an SDR way of the embodiment of the present disclosure supporting interchange of receiving and sending of a baseband signal.

In the above networking way, preferably, the mobile terminal is implemented by an SDR way. A baseband signal easily performs interchange between uplink processing and downlink processing, originally a radio frequency part is reciprocal in a Time Division Duplexing (TDD) mode, therefore an influence on the mobile terminal is small; a Frequency Division Duplexing (FDD) mode requires analog filters, which are for radio frequency sending and receiving, to have an interchange ability, and the influence on a mobile terminal hardware is relatively large. While the mobile terminal of the embodiment of the present disclosure implemented by the SDR way can have an ability of making baseband signal receiving and sending interchanged by adopting a low cost software upgrading way, as the relay mobile terminal shown in FIG. 6. The mobile terminal having the ability of making baseband signal receiving and sending interchanged can provide a relay service, and support a point to point radio interconnection.

Figure 7:
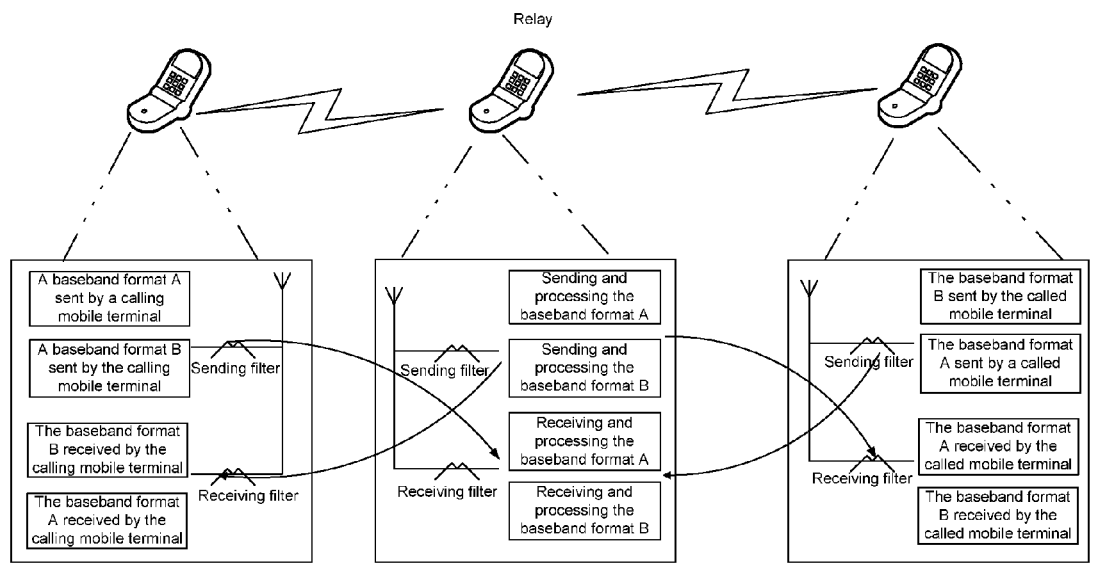
FIG. 7 is a schematic diagram showing a mobile terminal implemented by an Application Specific Integrated Circuit (ASIC) way of the embodiment of the present disclosure supporting interchange of receiving and sending of a baseband signal.

The mobile terminal provided by the embodiment of the present disclosure may also be implemented by an ASIC way, as shown in FIG. 7. Through this way, a corresponding hardware resource is needed to be added to make the mobile terminal to have a base band signal receiving and sending interchanging function, therefore this way needs to invest more cost when compared with the SDR way.

Figure 8:
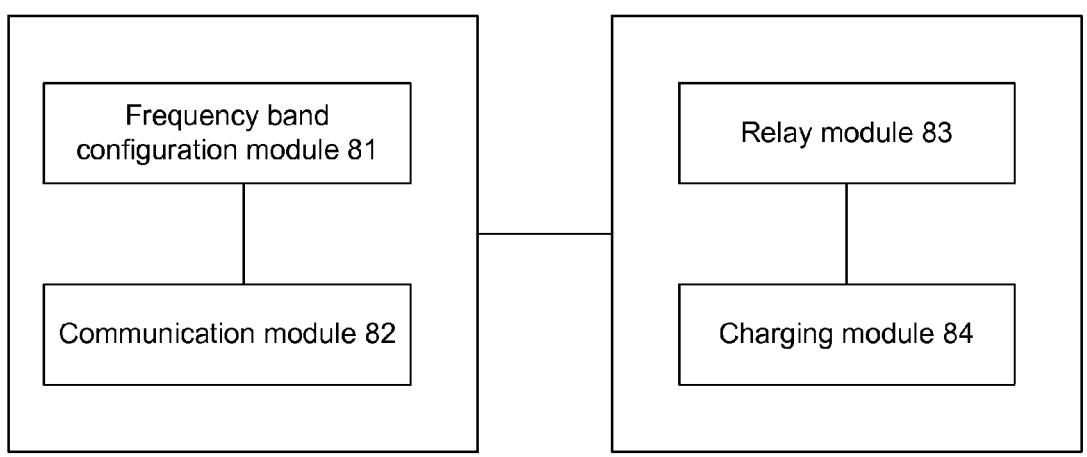
FIG. 8 is a structure schematic diagram of the mobile terminal of the embodiment of the present disclosure.

In order to implement the above networking method, the embodiment of the present disclosure further provides a mobile terminal, as shown in FIG. 8, the mobile terminal includes a frequency band configuration module 81 configured to configure information of the CB, the LB and the UB for the mobile terminal, and a communication module 82 configured to establish a radio communication connection on the CB or the LB or the UB.

The mobile terminal provided by the embodiment of the present disclosure is implemented by the SDR way or the ASIC way, supports various different mobile communication modes, supports frequency resources of the CB, the LB and the UB, and may further provide a relay service, have a point to point radio interconnection ability.

Preferably, the communication module 82 is further configured to establish a point to point radio communication connection on the LB or the UB.

The mobile terminal further includes a relay module 83 configured to provide a relay service for establishment of the radio communication connection on the CB or the LB or the UB.

The mobile terminal further includes a charging module 84, configured to acquire charging basic information from the relay module, and periodically report the charging basic information to a base station in a mobile communication network through a measurement message;

the relay module 83 is further configured to collect the charging basic information; wherein the charging basic information includes: information of one or more mobile terminals receiving a relay service, and a time length for providing the relay service and/or data traffic passing through the relay terminal.

In an actual application, the frequency band configuration module 81, the communication module 82, the relay module 83, and the charging module 84 may all be implemented by a Central Processing Unit (CPU), or a Digital Signal Processor (DSP), or a Field Programmable Gate Array (FPGA), etc.; wherein the CPU, the DSP, and the FPGA may all be deployed inside the mobile terminal.

It shall be understood by those skilled in the art, implementation functions of various processing modules of the mobile terminal shown in FIG. 8 may be appreciated with reference to relevant description of the above networking method for mobile terminals. It shall be understood by those skilled in the art, functions of various processing units in the mobile terminal shown in FIG. 8 may be implemented through a program operating on a processor, or may also be implemented through a specific logic circuit.

It is known from the above technical scheme of the embodiment of the present disclosure, the above networking method provided by the embodiment of the present disclosure can not only improve a utilization rate of a frequency spectrum resource, improve a resource usage rate of a base station, expand a coverage range of a mobile communication network, and can also improve mobile terminal user experience.

With regard to a mobile operator, this networking method can improve a space domain utilization rate of a frequency spectrum resource, and improve an ability of acquiring an investment income only by renting a frequency spectrum on the LB, and reduce investment of a hardware device (mainly referring to a base station) by taking the mobile terminal as a relay, on the LB and the UB.

With regard to a mobile terminal user, this networking method can bring income for the user: when the mobile terminal is idle, after it is permitted by the user, the shared charging revenue may be acquired by providing a relay service for other mobile terminals. In addition, this networking method supports a direct intercom function between two mobile terminals on the UB, and therefore the mobile terminal users can use an almost free or completely free intercom service.

All those described above are only preferred embodiments of the present disclosure, and are not used to limit the scope of protection of the present disclosure.

What is claimed is:

1. A networking method for mobile terminals, comprising:
   dividing a frequency spectrum resource suitable for operation in a mobile communication network into three kinds of frequency bands: a Commercial Frequency Band (CB), a Licensed Frequency Band (LB), and an Unlicensed Frequency Band (UB); and
   establishing, by a calling mobile terminal, a radio communication connection with a called mobile terminal on the CB or the LB or the UB, wherein the calling mobile terminal and the called mobile terminal are implemented by a Software Defined Radio (SDR) way;
   establishing, by the calling mobile terminal, a point to point radio communication connection with the called mobile terminal on the LB, when the calling mobile terminal and the called terminal are located in an area covered by the mobile communication network with available capacity;
   establishing, by the calling mobile terminal, the point to point radio communication connection with the called mobile terminal on the UB, when the calling mobile terminal and the called terminal are located in an area not covered by the mobile communication network, and when located in an area covered by the mobile communication network but the network capacity is full;
   acquiring, by a base station which receives a radio communication connection establishment request from the calling mobile terminal, position information of the calling mobile terminal and the called mobile terminal or a radio signal intensity measurement value between the calling mobile terminal and the called mobile terminal, when the calling mobile terminal and the called mobile terminal are located in an area covered by the mobile communication network; and
   notifying, by the base station, the calling mobile terminal to establish the point to point radio communication connection with the called mobile terminal on the authorized LB when the base station determines according to the position information that a distance between the calling mobile terminal and the called mobile terminal is smaller than a preset value, or that the radio signal intensity measurement value between the calling mobile terminal and the called mobile terminal is larger than a second preset value;
   wherein the calling mobile terminal establishes a point to point radio communication connection with the called mobile terminal through a single hop or multi-hop relay mobile terminal;
   wherein the relay mobile terminal reports periodically charging basic information to a base station in the mobile communication network through a measurement message;
   wherein the charging basic information comprises: information of one or more mobile terminals receiving a relay service provided by the relay mobile terminal, and a time length of the relay service provided by the relay mobile terminal to the one or more mobile terminals and data traffic transferred when the relay mobile terminal provides the relay service.

2. The networking method for mobile terminals according to claim 1, wherein the relay mobile terminal is implemented by the SDR way.

3. A mobile terminal, implemented by a Software Defined Radio (SDR) way; wherein a frequency spectrum resource suitable for operation in a mobile communication network comprising three kinds of frequency bands: a Commercial Frequency Band (CB), a Licensed Frequency Band (LB), and an Unlicensed Frequency Band (UB); and the mobile terminal comprising a memory storing programming instructions; and a processor configured to execute the stored programming instructions to perform steps comprising:
   configuring information of the CB and the LB and the UB; and
   establishing a radio communication connection on the CB or the LB or the UB;
   providing a relay service for establishment of the point to point radio communication connection on the LB or the UB;
   wherein the processor configured to execute the stored programming instructions to perform steps further comprising:
   establishing, by the calling mobile terminal, a radio communication connection with a called mobile terminal on the CB or the LB or the UB, wherein the calling mobile terminal and the called mobile terminal are implemented by a Software Defined Radio (SDR) way;
   establishing, by the calling mobile terminal, the point to point radio communication connection with the called mobile terminal on the LB, when the calling mobile terminal and the called terminal are located in an area covered by the mobile communication network with available capacity;
   establishing, by the calling mobile terminal, the point to point radio communication connection with the called mobile terminal on the UB, when the calling mobile terminal and the called terminal are located in an area not covered by the mobile communication network, and when located in an area covered by the mobile communication network but the network capacity is full;
   acquiring, by a base station which receives a radio communication connection establishment request from the calling mobile terminal, position information of the calling mobile terminal and the called mobile terminal or a radio signal intensity measurement value between the calling mobile terminal and the called mobile terminal, when the calling mobile terminal and the called mobile terminal are located in an area covered by the mobile communication network; and
   notifying, by the base station, the calling mobile terminal to establish the point to point radio communication connection with the called mobile terminal on the authorized LB when the base station determines according to the position information that a distance between the calling mobile terminal and the called mobile terminal is smaller than a preset value, or that the radio signal intensity measurement value between the calling mobile terminal and the called mobile terminal is larger than a second preset value;
   wherein the calling mobile terminal establishes a point to point radio communication connection with the called mobile terminal on the LB or the UB through a single hop or multi-hop relay mobile terminal;

wherein the relay mobile terminal reports periodically charging basic information to a base station in the mobile communication network through a measurement message;

wherein the charging basic information comprises: information of one or more mobile terminals receiving a relay service provided by the relay mobile terminal, and a time length of the relay service provided by the relay mobile terminal to the one or more mobile terminals and data traffic transferred when the relay mobile terminal provides the relay service.

* * * * *